(12) United States Patent
Boisseau et al.

(10) Patent No.: US 11,901,789 B2
(45) Date of Patent: Feb. 13, 2024

(54) ELECTROMAGNETIC DEVICE FOR CONVERTING MECHANICAL ENERGY INTO ELECTRICAL ENERGY HAVING A MAGNETIC CIRCUIT WITH TWO MAGNETIC FLUX GAPS

(71) Applicant: Commissariat à l'Energie Atomique et aux Energies Alternatives, Paris (FR)

(72) Inventors: Sébastien Boisseau, Grenoble (FR); Ghislain Despesse, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 7 days.

(21) Appl. No.: 17/659,075

(22) Filed: Apr. 13, 2022

(65) Prior Publication Data

US 2022/0337144 A1 Oct. 20, 2022

(30) Foreign Application Priority Data

Apr. 15, 2021 (FR) .................................... 21 03921

(51) Int. Cl.
*H02K 35/02* (2006.01)
*H02K 1/34* (2006.01)
(Continued)

(52) U.S. Cl.
CPC .............. *H02K 35/02* (2013.01); *H02K 1/34* (2013.01); *H02K 7/1876* (2013.01); *H02K 35/04* (2013.01)

(58) Field of Classification Search
CPC ........ H02K 33/00; H02K 35/02; H02K 35/00; H02K 35/04; H02K 3/26; H02K 15/02;
(Continued)

(56) References Cited

U.S. PATENT DOCUMENTS

| 358,682 A | * 3/1887 | Long ..................... H02K 33/16 310/36 |
| 3,394,275 A | 7/1968 | Lippmann |

(Continued)

FOREIGN PATENT DOCUMENTS

| CN | 102938605 B | 5/2016 |
| JP | 2020-078237 A | 5/2020 |

OTHER PUBLICATIONS

French Preliminary Search Report dated Dec. 27, 2021 in French Application 21 03921 filed on Apr. 15, 2021, citing documents AA-AD & AO-AP therein, 10 pages (with English Translation of Categories of Cited Documents & Written Opinion).

*Primary Examiner* — Maged M Almawri
(74) *Attorney, Agent, or Firm* — Oblon, McClelland, Maier & Neustadt, L.L.P.

(57) ABSTRACT

An electromagnetic device for converting input mechanical energy into output electrical energy, including a movable element that is able to make a vibratory mechanical movement, a vibration source configured to actuate the vibratory mechanical movement of the movable element, a coil, a magnetic circuit passing through the coil, the coil being configured to generate the output electrical energy when the movable element is making its vibratory mechanical movement, a permanent magnet arranged in the magnetic circuit and able to generate a magnetic flux, referred to as the total magnetic flux ($Fm\_T$), in the magnetic circuit.

19 Claims, 4 Drawing Sheets

(51) Int. Cl.
*H02K 7/18* (2006.01)
*H02K 35/04* (2006.01)

(58) Field of Classification Search
CPC ........ H02K 33/02; H02K 33/04; H02K 33/06; H02K 1/34; H02K 7/1876; H02K 2201/03; H02K 2213/03; H02N 2/188
USPC .................... 310/12.12, 12.15, 12.01, 28–36
See application file for complete search history.

(56) References Cited

U.S. PATENT DOCUMENTS

| | | | |
|---|---|---|---|
| 10,944,340 B2* | 3/2021 | Ueno | H10N 35/01 |
| 2008/0278008 A1* | 11/2008 | Roberts | H02K 35/06 |
| | | | 310/29 |
| 2010/0176664 A1* | 7/2010 | Roberts | H02K 35/02 |
| | | | 310/25 |
| 2012/0249804 A1* | 10/2012 | Suzuki | B81C 1/00658 |
| | | | 348/E3.05 |
| 2013/0342032 A1* | 12/2013 | Laurent | H02K 35/04 |
| | | | 310/306 |
| 2014/0097709 A1* | 4/2014 | Ueno | H02N 2/18 |
| | | | 310/26 |
| 2014/0333156 A1* | 11/2014 | Toyoda | H10N 35/101 |
| | | | 310/26 |
| 2014/0346902 A1* | 11/2014 | Ueno | H10N 35/101 |
| | | | 310/26 |
| 2015/0288269 A1 | 10/2015 | Ruff | |
| 2016/0314923 A1* | 10/2016 | Tsuneyoshi | H02K 7/1876 |
| 2016/0359401 A1* | 12/2016 | Deak, Sr. | H02K 35/02 |
| 2017/0093306 A1* | 3/2017 | Ueno | H02N 2/188 |
| 2018/0131371 A1* | 5/2018 | Liu | H03K 17/94 |
| 2018/0301969 A1* | 10/2018 | Takahashi | H04M 19/04 |
| 2018/0376247 A1 | 12/2018 | Bergs | |
| 2019/0097512 A1* | 3/2019 | Liu | H02K 7/1876 |
| 2021/0351339 A1* | 11/2021 | Ueno | H10N 35/00 |
| 2022/0360198 A1* | 11/2022 | Haronian | H02N 2/18 |
| 2023/0170778 A1* | 6/2023 | Haronian | H02N 11/002 |
| | | | 310/15 |

* cited by examiner

ELECTROMAGNETIC DEVICE FOR CONVERTING MECHANICAL ENERGY INTO ELECTRICAL ENERGY HAVING A MAGNETIC CIRCUIT WITH TWO MAGNETIC FLUX GAPS

TECHNICAL FIELD OF THE INVENTION

The present invention relates to an electromagnetic device for converting mechanical energy into electrical energy.

PRIOR ART

Conversion of mechanical energy into electrical energy is a subject that has been addressed for many years. There are various types of devices for doing so. By way of example, certain use the piezoelectric effect, and others are based on an electromagnetic principle.

Currently, such devices are notably employed in the field of the type of household switches and industrial push-buttons that are said to be wireless and battery free. When the button or switch is pressed, the mechanical energy exerted is converted into electrical energy capable of powering a radio transmitter. The radio transmitter sends a message to a receiver that is intended to command an application (light, device, machine, etc.).

Many patent applications disclosing devices based on an electromagnetic principle have already been filed. Mention may notably be made of patent applications WO2007/060072A1, WO2009/109449A1 and EP1611662A1.

The basic operating principle of these devices was first described in patent application GB1312927.

This basic principle consists in inverting the magnetic flux through the yoke of a coil wound around a magnetic circuit, by making a magnet pivot. Depending on the position of the permanent magnet, the magnetic flux is oriented one way or the other. The magnetic-flux variation seen by the coil allows, by induction, a voltage to be created across the terminals of the coil. This voltage may then be used to power the radio transmitter. These devices are either monostable or bistable and are for example designed to be integrated into the mechanism of a switch.

To obtain a large variation in the flux through the coil and to maximize the electrical energy obtained, the mechanical movement created must be rapid and of high amplitude. These prior-art solutions are therefore not necessarily suitable for employment in solutions of limited bulk, and in which it is necessary for the mechanical movement to be of low amplitude.

For devices requiring a low actuation amplitude, a vibratory mechanical movement may be used.

The principle of harvesting electrical energy from a vibratory mechanical movement is described in U.S. Pat. No. 8,080,906B2, and in patent applications WO2005/062443A1 and WO2009/003799A1.

Figure 1:
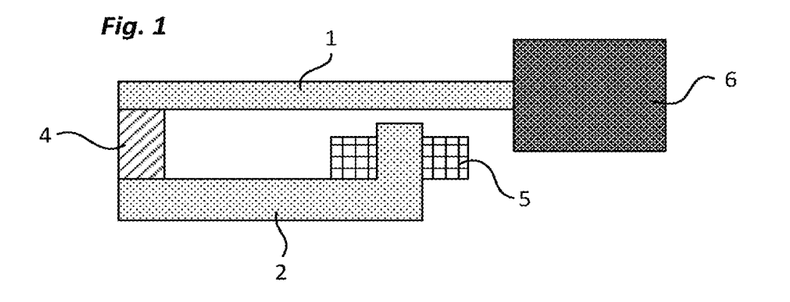
FIG. 1 schematically shows a device for converting mechanical energy into electrical energy, according to the prior art.

FIG. 1 schematically shows a converting device according to the prior art, which allows electrical energy to be generated from vibratory mechanical energy. This device comprises a magnetic circuit composed of a plurality of legs in which is inserted a permanent magnet capable of creating a magnetic flux in the circuit. The magnetic circuit passes through the yoke of an electromagnetic coil. The magnetic circuit comprises a variable gap created by the bending movement of a beam partially inserted in the magnetic circuit. The beam is fastened at one end, via which its bending movement is actuatable, and bears at its free end a mass allowing its vibratory movement to be promoted.

This solution is unsatisfactory because it does not allow a sufficiently large variation in the flux through the coil to be obtained. Specifically, the permanent magnet inserted in the magnetic circuit behaves as a constant gap that is added to the variable gap. In practice, it is thus observed that, whatever the position of the beam, and therefore of the value of the variable gap, most of the magnetic flux of the magnet still passes through the variable gap. The coil thus observes little or no variation in magnetic flux, this preventing a sufficient output voltage from being obtained.

The aim of the invention is therefore to provide a converting device that is capable of maximizing the electrical energy obtained from mechanical energy that is vibratory, i.e. the amplitude of movement of which is low, and for example lower than 1 mm and/or lower than five times the length of the magnet in the direction of its polarization.

SUMMARY OF THE INVENTION

This aim is achieved via an electromagnetic device for converting input mechanical energy into output electrical energy, comprising:
  a movable element that is able to make a vibratory mechanical movement,
  a vibration source configured to actuate the vibratory mechanical movement of the movable element,
  a coil,
  a magnetic circuit passing through said coil, said coil being configured to generate the output electrical energy when said movable element is making its vibratory mechanical movement,
  a permanent magnet arranged in the magnetic circuit and able to generate a magnetic flux, referred to as the total magnetic flux, in the magnetic circuit,
  the magnetic circuit comprising a first gap and a second gap,
  said first gap remaining substantially constant and said second gap being variable as a function of the position taken by the movable element during its vibratory mechanical movement,
  the permanent magnet being arranged in the magnetic circuit so that the total magnetic flux splits into a first magnetic flux through a first portion of the magnetic circuit comprising the constant gap and into a second magnetic flux through a second portion of the magnetic circuit comprising the variable gap,
  the coil being passed through by a single portion of the magnetic circuit, which portion is chosen from the first portion of the magnetic circuit and the second portion of the magnetic circuit,
  the ratio between the first magnetic flux and the second magnetic flux varying as a function of the position of the movable element.

According to one particularity, the movable element comprises at least one first leg integrated into the magnetic circuit.

According to another particularity, the magnetic circuit comprises a second leg and the device comprises a link joining the first leg to the second leg.

According to another particularity, the link is inserted in the magnetic circuit and the first gap is integrated into said link.

According to another particularity, the first gap is arranged in a junction leg joining said first leg to said second leg, which leg is arranged parallel to said link.

According to one particular embodiment, the link is a spring link apt to permit the vibratory mechanical movement of the movable element.

According to another particular embodiment, said link is a stiff link and the first leg and/or the second leg is configured to flex with a view to permitting the vibratory mechanical movement.

According to one particularity, said first leg takes the form of a beam fastened to said link by a first end portion and that comprises a second end portion opposite that is free.

According to one particular embodiment, the magnetic circuit comprises a third gap that is variable and said movable element is arranged to oscillate between said second gap and said third gap.

According to another particular embodiment, a first end portion of said first leg is held in abutment, against a portion made of non-ferromagnetic material forming the first gap, by at least one spring mounted between the first leg and the second leg.

According to another particular embodiment, the first leg is formed from a deformable membrane, and the link comprises an annular portion forming a link with the second leg.

According to one particularity, the device comprises a seismic mass borne by the movable element.

According to one particular embodiment, the seismic mass is made of a ferromagnetic material and the second gap is arranged between said seismic mass and the second leg of the magnetic circuit.

According to one particularity, the vibration source comprises a vibrating carrier to which said second leg is connected at a fastening point.

According to one particularity, the fastening point is positioned along an axis passing through the centre of gravity of the seismic mass when the movable element is at rest.

According to one particular embodiment, the coil is positioned around the first leg of the magnetic circuit.

According to another particular embodiment, the coil is positioned around the second leg of the magnetic circuit.

BRIEF DESCRIPTION OF THE FIGURES

Other features and advantages will become apparent from the following detailed description, which is given with reference to the appended drawings, in which.

DETAILED DESCRIPTION OF AT LEAST ONE EMBODIMENT

The converting device of the invention is intended to convert mechanical energy into electrical energy. The input mechanical energy is delivered in a vibratory form. The output electrical energy is generated, from the input mechanical energy, using electromechanical means.

The device is intended to exploit vibrations of relatively low amplitudes, and typically smaller than 1 m/s$^2$ at 50 Hz, i.e. often smaller than 10 µm in amplitude, and possibly ranging up to at most 1 mm in amplitude if the frequency of vibration of the vibration source corresponds to the resonant frequency.

The vibration source may be a vibrating carrier 70 to which the device is fastened. This vibrating carrier may be subject to an external mechanical force that drives it to vibrate.

The device mainly comprises:
- a magnetic circuit;
- an electromagnetic coil 50 comprising a carrier and a winding formed around its carrier, said winding being positioned around the magnetic circuit;
- a permanent magnet 40 arranged to generate a magnetic flux through the magnetic circuit;
- a movable element 100 that may be made to make a vibratory mechanical movement. The movable element 100 comprises at least one portion made of ferromagnetic material, which portion is inserted in the magnetic circuit. A magnetic flux is therefore liable to pass through this portion of the movable element;
- a vibration source allowing the vibratory mechanical movement of the movable element 100 to be generated.

The magnetic circuit comprises a plurality of legs made of ferromagnetic material that are joined together and that define therebetween a path followed by the magnetic flux, said path comprising at least one first gap E1 and one second gap E2, the second gap E2 being distinct from the first gap E1.

By leg of the magnetic circuit, what is meant is an element of any shape the cross-sectional area of which is sufficient to ensure passage of the magnetic flux. A leg may have an elongate, right or elbowed shape. It will be seen that provision may also be made for other shapes.

The first gap E1 remains constant, i.e. the non-zero distance that separates the two portions of the magnetic circuit forming this first gap E1 always remains substantially identical, whatever the position of the movable element 100.

The second gap E2 is variable, i.e. the distance that separates the two portions of the magnetic circuit forming this second gap varies over time, as a function of the position of the movable element 100.

Figure 2:
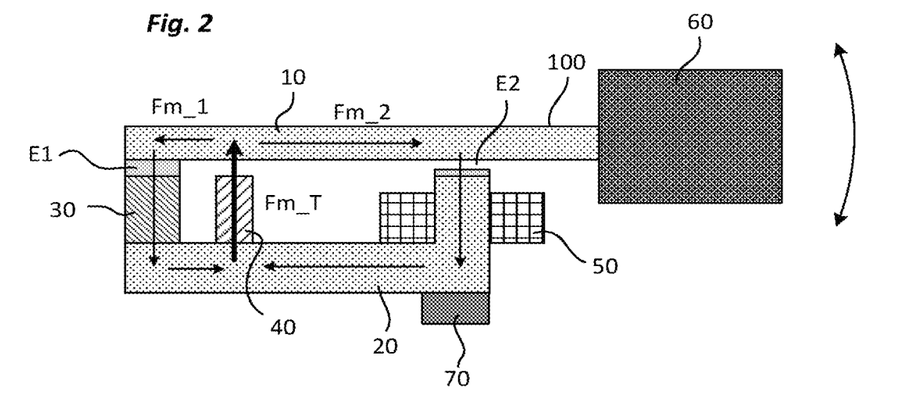
FIG. 2 illustrates the operating principle of the converting device according to the invention.

With reference to FIG. 2, contrary to the prior-art solution shown in FIG. 1, in the invention the permanent magnet 40 is arranged, with respect to the magnetic circuit, so as to generate a first magnetic flux Fm_1 in a first portion of the magnetic circuit comprising the constant first gap E1 and a second magnetic flux Fm_2 in a second portion of the magnetic circuit comprising the variable second gap E2. In other words, the permanent magnet 40 generates a total magnetic flux Fm_T that is split between the first magnetic flux Fm_1 and the second magnetic flux Fm_2, the ratio between the first magnetic flux and the second magnetic flux then being dependent on the value of the variable gap, and therefore on the position of the movable element 100.

The coil 50 is positioned in the portion of the magnetic circuit liable to see the largest variation in magnetic flux. It may be passed through by the first portion of the magnetic circuit or by the second portion of the magnetic circuit, which portion was defined above.

It will be seen below that in certain variant embodiments, certain segments of the magnetic circuit may be common to its first portion and to its second portion. The two portions are thus distributed between the various legs from which the magnetic circuit is composed.

The magnetic circuit mainly comprises a first leg 10, a second leg 20 and a link 30 between the first leg and the second leg.

The movable element 100 is for example integrated into the first leg 10.

The movable element 100 may be formed from a deformable beam.

In the latter case, it will be noted that to manufacture a resonator that operates at low frequency (<150 Hz), it is useful to provide a beam having a relatively high length/thickness ratio (for example one higher than 20). For reasons regarding manufacture and robustness, the thickness of the beam cannot however be too small: the length of the beam must be relatively large with respect to the other dimensions of the device.

The beam may be fastened by a first end portion and free at a second end portion.

The second end portion of the beam may bear a seismic mass 16 allowing its vibratory movement to be promoted and the recoverable power to be increased.

In its first end portion, the beam may be fastened to a second leg of the magnetic circuit via the link 30. The link 30 may exhibit a spring effect, allowing it to permit the vibratory movement of the movable element. As a variant, the link 30 may also be stiff, the spring effect allowing the vibratory movement then being generated by a least one of the two legs 10, 20 of the device, which have mechanical properties such as to be able to bend.

The link 30 may be integrated into the magnetic circuit and used to pass the first magnetic flux Fm_1 or the second magnetic flux Fm_2. However, the link 30 may also be employed to perform only a mechanical spring function, allowing the beam to bend during its vibratory movement.

In its first end portion, the beam may abut against a pad secured to the second leg of the magnetic circuit. The link 30 is then replaced by a first spring 90 mounted between the movable element and the second leg. A second spring 91 may be mounted and configured to limit the movement of the seismic mass 60 with respect to the second leg 20.

The first gap may be inserted in the magnetic circuit, in the link between the first leg and the second leg.

The first gap E1 may be inserted between the beam and said pad.

The first gap E1 may be formed from a layer or part made of non-ferromagnetic material.

The second leg 20 has a free end with respect to which the movable element 100 creates the second gap E2.

The second gap E2 may be formed between the seismic mass 60 borne by the beam and the free end of the second leg 20.

The second gap E2 may be a double gap, i.e. be defined by two distinct spaces between the movable element 100 and the free end of the second leg 20.

The second gap E2 varies with the movement of the movable element with respect to the second leg 20. A stop may be placed to limit the range of the mechanical movement of the movable element 100, i.e. to prevent the second gap E2 from decreasing to zero. This may be useful if the electromagnetic force becomes too strong when the gap becomes very small, running the risk of electromagnetic bonding; typically, this occurs when this electromagnetic force increases above the elastic return force exerted on the movable element 100.

Non-limitingly, the first gap E1 and the second gap E2 may be chosen to be almost identical when the movable element 100 is at rest.

The permanent magnet 40 may be fastened to the first leg 10 and/or to the second leg 20 of the magnetic circuit. It is oriented so as to generate the total magnetic flux Fm_T in the magnetic circuit, this total magnetic flux Fm_T being split between the first magnetic flux Fm_1 that passes through the first gap E1 and the second magnetic flux Fm_2 that passes through the second gap E2. The permanent magnet 40 may of course be magnetically oriented in either direction between the two legs of the magnetic circuit, in order to polarize the magnetic field generated in the magnetic circuit in the desired direction.

The vibration source may be a vibrating carrier 70 to which the device is fastened, in order to generate and maintain the vibratory movement of the movable element 100.

Non-limitingly, the second leg 20 may notably be fastened to the vibrating carrier 70. Depending on the configuration of the device, when such is possible, the point at which the device is fastened to the vibrating carrier 70 may ideally be aligned with the centre of gravity of the seismic mass in the direction of the vibration (see FIG. 4 with G the centre of gravity of the seismic mass 60), in order to limit torsional torque on the mounting when the seismic mass is moving.

Any additional mass may be added to the movable element 100 to promote its vibratory movement and to increase the convertible mechanical energy.

It will be noted that increasing the seismic mass (mass m) located at the end of a beam does not necessarily result in a larger relative movement. Specifically, if this mass is increased, the beam will be stiffened so that the resonant frequency (Fr) remains close to the frequency of the vibration source $Fr=1/(2\pi)*\sqrt{(k/m)}$. The amplitudes of the relative movement between the carrier and the seismic mass will remain substantially equal to the amplitude of the vibration multiplied by the quality factor Q. The recoverable power is proportional to Q*m. Therefore, the higher the mass, the more energy may be harvested at equal input vibration amplitude.

The coil 50 may be passed through by the first leg 10 of the magnetic circuit or by the second leg 20 of the magnetic circuit.

The device may have a structure that is symmetric with respect to a vertical plane, or axisymmetric about an axis (A).

In one axisymmetric version, the movable element 100 may take the form of a membrane that is able to deform during its vibratory mechanical movement.

The two legs 10, 20 may also take the form of plates, that are joined to each other.

It will be noted that the permanent magnet 40 does not necessarily completely fill the space between the two legs 10, 20 of the magnetic circuit. In practice, as the permeability of the permanent magnet 40 is close to that of vacuum, provided that this space remains insignificant with respect to the length of the magnet, to induce the magnetic field in the magnetic circuit it is not necessary for the two legs to make mechanical contact. This particularity makes it possible to use magnets the dimensional characteristics of which are not crucial, thus decreasing their cost. Moreover, the space between the free end of the permanent magnet and the leg located facing (first leg or second leg according to the circumstances) may be used to adjust, without requiring a high dimensional precision, the inductance level in the magnetic circuit with respect to the intrinsic induction of the permanent magnet.

It will be noted that certain of the features listed above may be combined together. The general principles below are notably to be taken into account in the various possible configurations:

The bending allowing the vibratory movement to be permitted may occur in the first leg 10, in the second leg 20 and/or in the link 30.

The link 30 may be a simple continuity of the second leg 20 or of the first leg 10, the first gap E1 then being positioned, according to the circumstances, between the link 30 and the first leg 10 or between the link 30 in the second leg 20.

The gaps E1 and E2 are advantageously small with respect to the length of the permanent magnet 40 (the length of the magnet in its polarization direction may be 3 to 10 times larger than the length of each gap).

Various variants of embodiment of the device having these various features will be described below with reference to FIGS. 3 to 12.

In the description given below of each of the variants, only noteworthy particularities are highlighted. It will be understood that various other arrangements may be provided in each case, for example as regards the position of the coil 50, of the permanent magnet 40, the shape of each leg 10, 20 of the circuit, and/or the function of the link 30, though the operating principle is in every case the one described above with reference to FIG. 2.

FIG. 3

Figure 3:
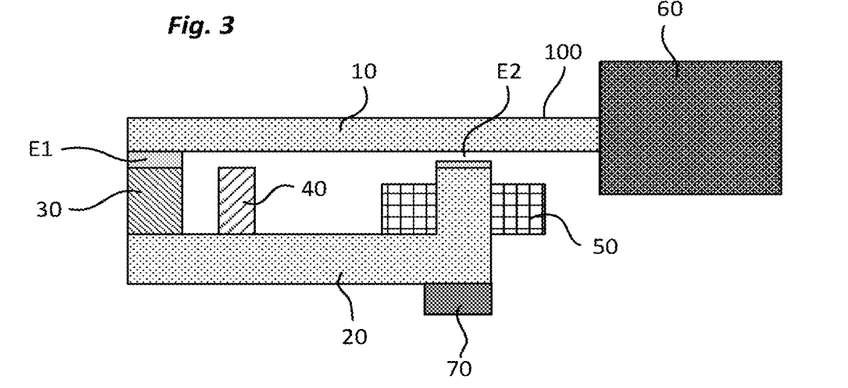
FIGS. 3 to 12 show various variants of embodiment of the converting device of the invention.

In FIG. 3, the simplest architecture of the device is illustrated. This architecture corresponds to that of FIG. 2, which was described above.

It comprises the first leg 10 and the second leg 20, which are formed by two beams in parallel. The link 30 connects one end of each leg and is configured to generate the spring effect. The second leg is elbowed at its free end. The movable element 100 is integrated into the first leg 10. The movable element 100 bears at its free end a seismic mass 60 that is intended to increase the input mechanical power.

The first gap E1 is formed from a portion made of non-ferromagnetic material inserted in the link between the first leg 10 and the second leg 20.

The second gap E2 is inserted between the free end of the second leg 20 and the first leg 10, which incorporates the movable element.

The permanent magnet 40 is fastened to the second leg 20 and oriented to generate a total magnetic flux, which splits into a first magnetic flux Fm_1 through the first gap E1 and a second magnetic flux Fm_2 through the second gap E2.

The coil 50 is positioned around the second leg 20.

As a variant of this configuration, as described above, the link 30 may be stiff, the first leg 10 then being bendable and performing the spring function. In this configuration, the link 30 is then included in the second leg 20 and merely prolongs the latter. It will be noted that the bendability may also be allocated to the second leg 20.

In this variant of embodiment, the second leg 20 is anchored to the vibrating carrier 70 allowing the vibratory movement of the movable element 100 to be generated.

FIG. 4

Figure 4:
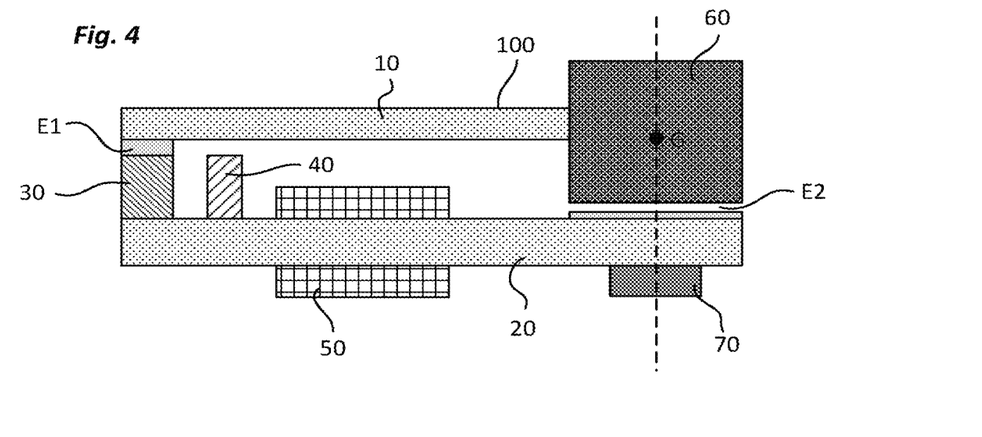

The variant of embodiment of FIG. 4 differs from that of FIG. 3 in that the movable element 100 is integrated into the magnetic circuit and is therefore also the first leg 10. The seismic mass 60 is made of a ferromagnetic material, said mass forming the second gap E2 with the second leg 20. The second magnetic flux Fm_2 is therefore capable of passing right through the movable element 100 and the seismic mass 60 to cross the second gap E2.

FIG. 5

Figure 5:
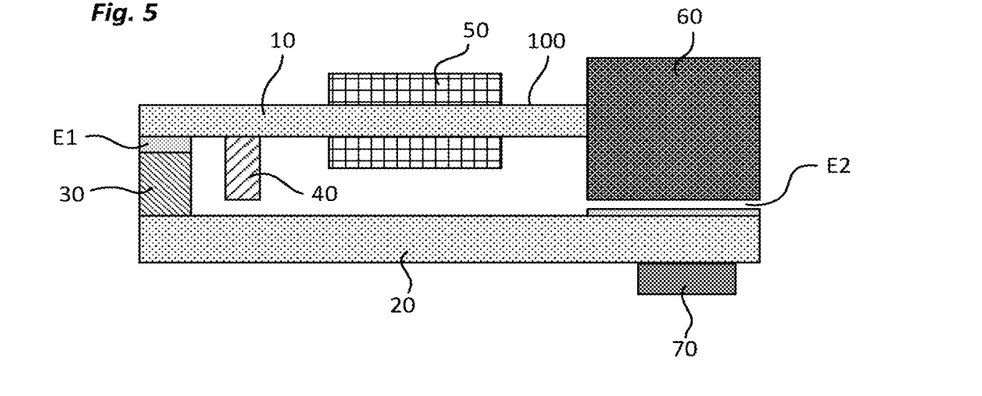

This variant of embodiment of FIG. 5 differs from that of FIG. 4 in that the coil 50 is positioned around the first leg 10 and the permanent magnet 40 is fastened to the first leg. This arrangement allows the mass of the movable element 100 to be increased and therefore the available mechanical energy to be increased. This principle may be applied generally to the other variants of embodiment.

FIG. 6

Figure 6:
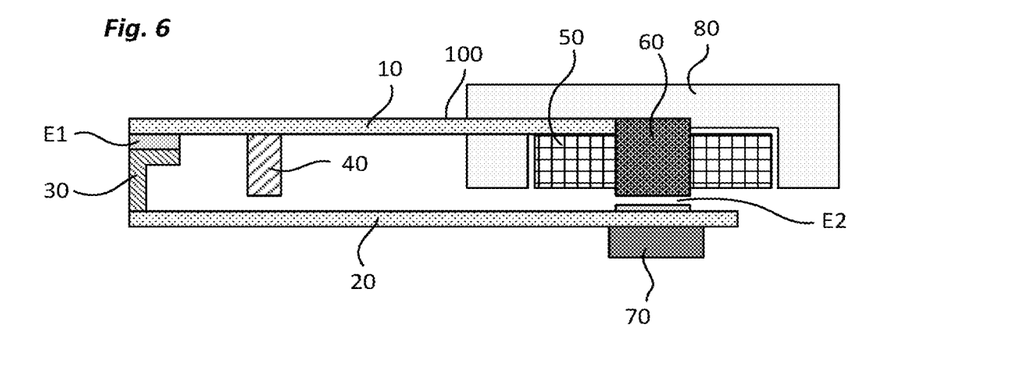

In the variant of FIG. 6, to transmit the movement of the vibrating carrier 70 to the movable element, the second leg 20 and the link 30 are produced in the form of flexible portions.

The coil 50 is borne by the first leg 10 and an additional mass 80 has been added to the seismic mass 60.

FIG. 7

Figure 7:
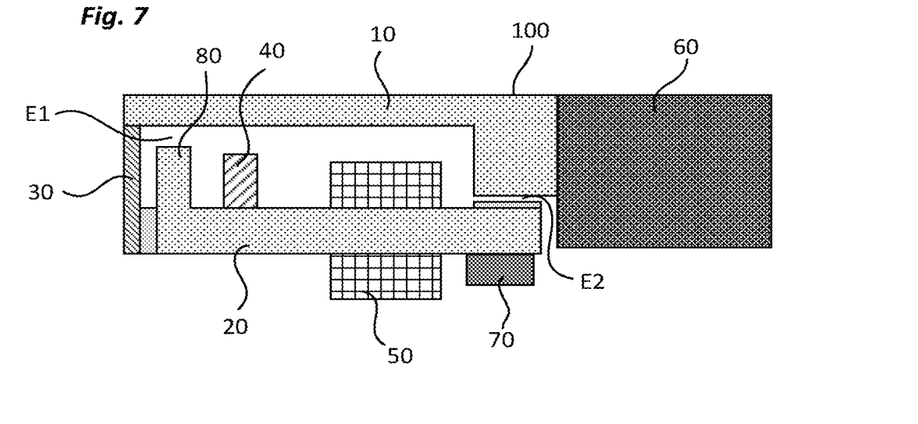

In the variant of FIG. 7, the first gap E1 is separate from the mechanical link between the first leg 10 and the second leg 20. The link is employed only to mechanically connect the two legs and it is not made of ferromagnetic material or otherwise has a cross-sectional area insufficient to let the magnetic flux pass. The first gap E1 is arranged between the first leg 10 and an additional leg that is fastened to the second leg 20. The first gap E1 could also be arranged between the second leg 20 and the additional leg fastened to the first leg 10. This additional leg is dimensioned to make the magnetic flux pass between the two legs 10, 20, via the first gap E1.

FIG. 8

Figure 8:
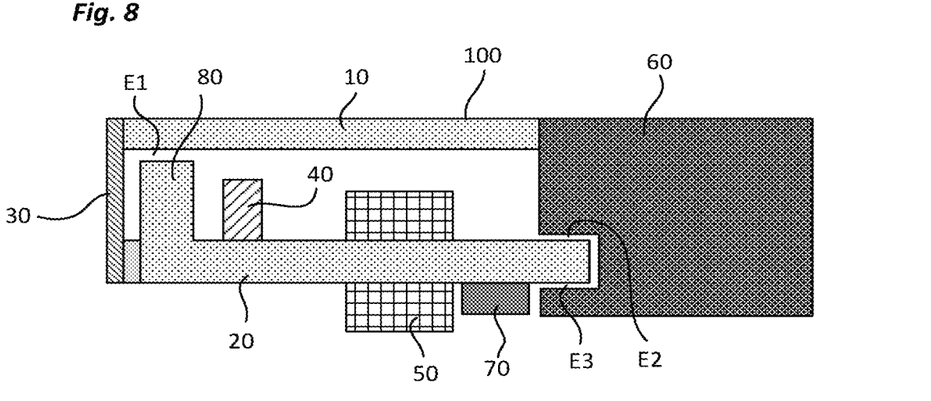

In the variant of FIG. 8, the second gap E2 is a double gap. Thus, there are two variable gaps E2, E3 between the first leg 10 and the second leg 20. When one of the two gaps is maximum, the other is minimum and vice versa.

This solution allows the frequency of the variation in reluctance to be two times the frequency of the vibration.

FIG. 9

Figure 9:
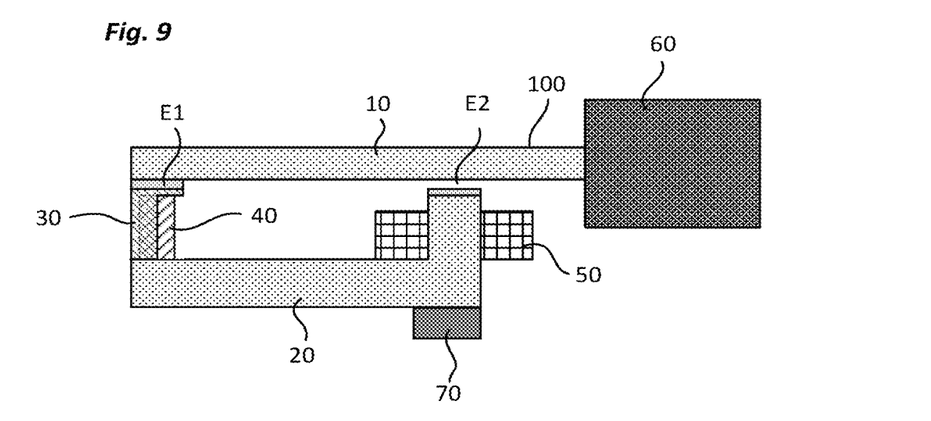

In the variant of FIG. 9, the link 30 between the two legs 10, 20 and the first gap E1 has been duplicated. This solution allows the permanent magnet 40 to be placed in the space left free between the two portions of the link that are thus formed.

FIG. 10

Figure 10:
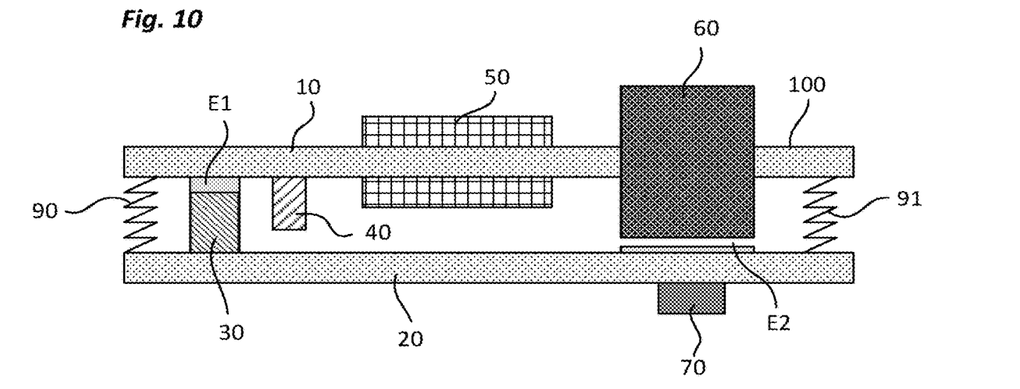

In this variant of FIG. 10, the movable element 100 is held in abutment against the link 30 by two springs 90, 91 that are each mounted between the second leg 20 and the first leg 10. The first gap E1 is produced using a layer of non-ferromagnetic material that is inserted between the movable element 100 and the link 30 in the region of abutment.

It will be noted that, as regards FIGS. 1 to 10, it is possible to replicate a plurality of times the mechanical system composed of the first leg 10, of the first gap E1, of the link 30, and of the second leg 20, these mechanical systems all being connected to the same seismic mass 60. For example, this may be done to achieve a right-left symmetry. However, it may also be done to block any rotational movement of the seismic mass 60, for example by placing three arms at 120° in the plane. These symmetries allow, for example, the rotational moments of the seismic mass 60 to be limited, or indeed allow the centre of gravity of the overall mass of the device to be aligned, along the axis of the movement, with the centre of gravity of the portion of the mass that is in relative movement. This makes it possible to limit the moments of rotation on the vibrating carrier whatever the amplitude of the relative movement, provided that the vibrating carrier 70 is itself fastened in the alignment of the centres of gravity, in the direction of the movement.

FIG. 11

Figure 11:
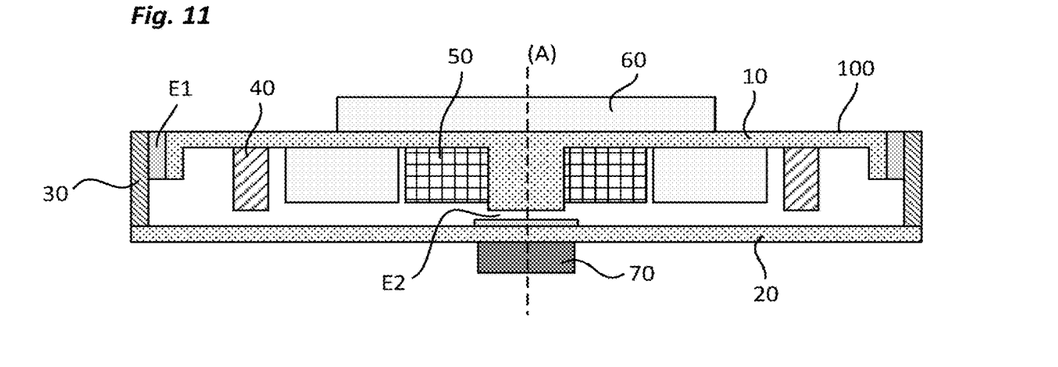

As in FIG. 11, the device may have an axisymmetric shape. The device thus takes the form of a cylinder produced using two discs (first disc forming the leg 10 and second disc forming the leg 20) that are parallel and interlocked. An annular space is left between the two discs to form the first gap E1. A first disc 10 for example bears a central pad around which is inserted the coil, this central pad extending axially in the direction of the second disc, the second gap E2 being formed between said pad and the second disc. The permanent magnet 40 is annular in shape, is fastened to one of the two discs, and is arranged concentrically with the central pad. The second disc may be anchored to a vibrating carrier 70. The first disc may bear a mass 60 and take the form of a membrane capable of deforming during its vibratory movement. As a variant, the second disc 20 may also behave as a deformable membrane.

In both these variants, the membrane may be unapertured, but may also optionally be structured to increase its flexibility, for example with a spiral pattern, or even a corrugation. As regards the permanent magnet 40, it may be ring-shaped, but may also be composed of discrete magnets regularly distributed circumferentially.

FIG. 12

Figure 12:
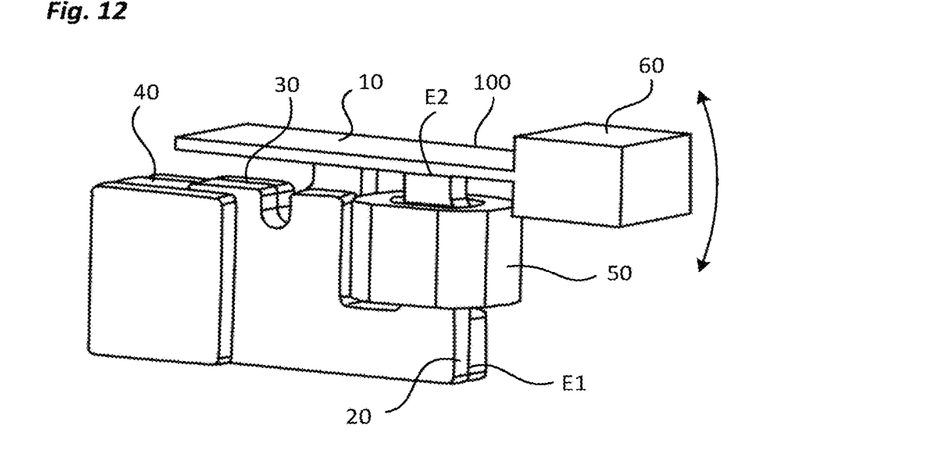

In this variant of FIG. 12, the second leg 20 and the link 30 each take the form of a ferromagnetic plate. These two plates are joined to either side of a layer made of non-ferromagnetic material forming the constant first gap E1.

The two plates may each have an extension. The movable element 100 is a least partially integrated into the first leg 10. The movable element 100 is positioned to extend between the two extensions, so as to define the second gap E2. The permanent magnet 40 is for example engaged between two ferromagnetic elements, each of which is fastened to one of the first and second plates to create the magnetic circuit. The movable element 100 may be mounted on a carrier (not shown) and a spring solution may be employed to permit the relative movement of the movable element 100 with respect to the vibrating carrier 70.

Below, a configuration that will allow the principle of the invention to be better understood is described by way of example.

At rest, the two gaps E1, E2 are identical: the total magnetic flux Fm_T of the permanent magnet is thus shared substantially equally between the first portion and the second portion of the magnetic circuit, and thereby passes through the first gap E1 and through the second gap E2, respectively. The magnetic permeability of the magnetic circuit is considered to be very much higher than the magnetic permeability of the gaps, and the gaps therefore have a preponderant influence on the value of the reluctances.

When the movable element is in its low position (at the maximum of the relative movement), the second gap E2 is for example considered to be equal to half the first gap (E2=½×E1). In this position, ⅔ of the total magnetic flux Fm_T passes through the second portion of the magnetic circuit, via the second gap E2 and ⅓ of the total magnetic flux Fm_T passes through the first portion of the magnetic circuit, via the first gap E1.

In high position (at the maximum of the relative movement), the second gap E2 is for example considered to be equal to 1.5 times the first gap (E2=3/2×E1). In this position, ⅖ of the total magnetic flux Fm_T passes through the second portion of the magnetic circuit, via the second gap E2, and ⅗ of the total magnetic flux passes through the first portion of the magnetic circuit, via the first gap E1.

Between the low and high positions, the coil 50 sees a variation in flux from ⅖ to ⅔ of the total magnetic flux Fm_T.

By way of example, if the total magnetic flux Fm_T is considered to produce a magnetic field of 1 T, in the second gap E2 in low position, the magnetic field that passes through the second portion of the magnetic circuit will then vary from 0.6 to 1 T and the magnetic field that passes through the first portion of the magnetic circuit will vary from 0.5 T to 0.9 T. The coil 50 will see a variation of 0.4 T.

Moreover, it is possible to determine the magnetic energy that the device is able to generate and the gap cross-sectional area required to generate this magnetic energy. To do this, the following data may be taken into account:

A seismic mass m=20 g;

A vibration frequency of F=50 Hz;

The second gap E2 located at ⅔ of the centre of gravity of the seismic mass;

A vibration of maximum acceleration of A=0.2 m/s² and a maximum mechanical amplification of 100;

A maximum beam-end movement that is of 203 μm and a movement level with the second gap that is of 135 μm in either direction;

The second gap at rest is for example equal to two times this movement, i.e. 270 μm;

With a desired effective coupling $k^2$ of 0.6, a maximum deformation mechanical energy that then equals $E_{meca-max}$=ke*x²=1608*(135 μm)²=29.3 μJ.

With a coupling loss of 0.2 due to copper losses, a required variation in magnetic energy that is of (0.6+0.2)*$E_{meca-max}$=0.8*29.3 μJ=23.5 μJ;

From the minimum gap to the maximum gap, it is then necessary, during this variation, to convert twice this energy, i.e. 47 μJ.

The magnetic energy in each of the gaps equals $E_{mag}$=B²/(2μ 0)*$V_{gap}$ with $V_{gap}$ the volume of the gap;

A set gap cross-sectional area of 0.73 mm².

The solution of the invention thus has many advantages, among which:

It allows a large variation in flux through the coil to be obtained, from a vibratory movement of relatively low amplitude;

It allows the device to be used in systems of limited bulk;

It remains of relatively simple design, using means commonly employed in the field of electromagnetics;

It may be produced according to various variants of embodiment that all obey the same operating principle;

It makes it possible to employ magnets the dimensional characteristics of which are not essential, thus decreasing their cost.

The invention claimed is:

1. An electromagnetic device to convert input mechanical energy into output electrical energy, comprising:

a movable element configured to make a vibratory mechanical movement, a vibration source configured to actuate the vibratory mechanical movement of the movable element, a coil, a magnetic circuit passing through said coil, said coil being configured to generate the output electrical energy when said movable element makes the vibratory mechanical movement, a permanent magnet arranged in the magnetic circuit and configured to generate a total magnetic flux in the magnetic circuit, wherein the magnetic circuit comprises a first gap and a second gap, said first gap is substantially constant and said second gap is variable as a function of a position of the movable element during the vibratory mechanical movement, the permanent magnet is arranged at a position in the magnetic circuit so that the total magnetic flux splits into a first magnetic flux through a first portion of the magnetic circuit including the first gap but not the second gap, and a second magnetic flux through a second portion of the magnetic circuit comprising the second gap but not the first gap, the first portion and the second portion being separated and defined by the position of the permanent magnet, the coil is passed through by only a single portion of the magnetic circuit, the single portion is one of the first portion of the magnetic circuit and the second portion of the magnetic circuit, and a ratio between the first magnetic flux and the second magnetic flux varies as a function of the position of the movable element.

2. The electromagnetic device of claim 1, wherein the vibration source is attached to the movable element.

3. The device according to claim 1, wherein the movable element comprises a first leg integrated into the magnetic circuit.

4. The device according to claim 3, wherein the magnetic circuit comprises a second leg, and the device comprises a link joining the first leg to the second leg.

5. The device according to claim 4, wherein the link is a spring link configured to permit the vibratory mechanical movement of the movable element.

6. The device according to claim 4, wherein said link is a stiff link and the first leg and/or the second leg is configured to flex to permit the vibratory mechanical movement.

7. The device according to claim 4, wherein said first leg is a beam fastened to said link by a first end portion and has a second end portion opposite that is free.

8. The device according to claim 4, wherein the magnetic circuit comprises a third gap that is variable, and said movable element is arranged to oscillate between said second gap and said third gap.

9. The device according to claim 4, wherein a first end portion of said first leg is held in abutment, against a portion made of non-ferromagnetic material forming the first gap, by at least one spring mounted between the first leg and the second leg.

10. The device according to claim 4, wherein the first leg is formed from a deformable membrane, and the link comprises an annular portion forming a link with the second leg.

11. The device according to claim 4, wherein the coil is positioned around the first leg of the magnetic circuit.

12. The device according to claim 4, wherein the coil is positioned around the second leg of the magnetic circuit.

13. The device according to claim 4, wherein the link is inserted in the magnetic circuit, and the first gap is integrated into said link.

14. The device according to claim 13, wherein the first gap is arranged in a junction leg joining said first leg to said second leg, which is arranged parallel to said link.

15. The device according to claim 4, wherein a seismic mass is borned by the movable element.

16. The device according to claim 15, wherein the seismic mass is made of a ferromagnetic material, and the second gap is arranged between said seismic mass and the second leg of the magnetic circuit.

17. The device according to claim 15, wherein the vibration source comprises a vibrating carrier to which said second leg is connected at a fastening point.

18. The device according to claim 17, wherein the fastening point is positioned along an axis passing through a center of gravity of the seismic mass when the movable element is at rest.

19. An electromagnetic device for converting input mechanical energy into output electrical energy, comprising:

a movable element configured to make a vibratory mechanical movement, a vibration source configured to actuate the vibratory mechanical movement of the movable element, a coil, a magnetic circuit passing through the coil, the coil being configured to generate the output electrical energy when the movable element makes the vibratory mechanical movement, a permanent magnet arranged in the magnetic circuit and configured to generate a total magnetic flux in the magnetic circuit, wherein the magnetic circuit comprises a first gap and a second gap, said first gap is substantially constant and the second gap is variable as a function of a position of the movable element during the vibratory mechanical movement, the permanent magnet is arranged in the magnetic circuit so that the total magnetic flux splits into a first magnetic flux through a first portion of the magnetic circuit comprising the first gap and a second magnetic flux through a second portion of the magnetic circuit comprising the second gap, the coil is passed through by a single portion of the magnetic circuit, the single portion is one of the first portion of the magnetic circuit and the second portion of the magnetic circuit, a ratio between the first magnetic flux and the second magnetic flux varies as a function of the position of the movable element;

wherein the movable element comprises a first leg integrated into the magnetic circuit, and wherein the magnetic circuit comprises a second leg, and the device comprises a link joining the first leg to the second leg.

* * * * *

UNITED STATES PATENT AND TRADEMARK OFFICE
CERTIFICATE OF CORRECTION

| | | |
|---|---|---|
| PATENT NO. | : 11,901,789 B2 | Page 1 of 1 |
| APPLICATION NO. | : 17/659075 | |
| DATED | : February 13, 2024 | |
| INVENTOR(S) | : Boisseau et al. | |

It is certified that error appears in the above-identified patent and that said Letters Patent is hereby corrected as shown below:

On the Title Page

Item (71), Under "Applicant:", Line 1, delete "l'Energie" and insert -- l'Energie --, therefor.

Signed and Sealed this
Second Day of July, 2024

Katherine Kelly Vidal
*Director of the United States Patent and Trademark Office*